(12) United States Patent
Gallou et al.

(10) Patent No.: US 7,877,439 B2
(45) Date of Patent: Jan. 25, 2011

(54) DATA REQUESTING AND TRANSMITTING DEVICES AND PROCESSES

(75) Inventors: Gilles Gallou, Acigne (FR); Angelo Mazzante, Thorigne Fouillard (FR); Henk Heijnen, Liffre (FR)

(73) Assignee: Thomson Licensing, Boulogne-Billancourt (FR)

( * ) Notice: Subject to any disclaimer, the term of this patent is extended or adjusted under 35 U.S.C. 154(b) by 678 days.

(21) Appl. No.: 10/553,533

(22) PCT Filed: Apr. 19, 2004

(86) PCT No.: PCT/EP2004/050566
§ 371 (c)(1),
(2), (4) Date: Nov. 1, 2006

(87) PCT Pub. No.: WO2004/093452
PCT Pub. Date: Oct. 28, 2004

(65) Prior Publication Data
US 2007/0143490 A1 Jun. 21, 2007

(30) Foreign Application Priority Data
Apr. 17, 2003 (EP) .................................. 03290954

(51) Int. Cl.
*G06F 15/16* (2006.01)

(52) U.S. Cl. ..................... 709/203; 709/231; 709/225; 709/226

(58) Field of Classification Search ................. 709/231, 709/203, 226, 225
See application file for complete search history.

(56) References Cited

U.S. PATENT DOCUMENTS

| | | | |
|---|---|---|---|
| 5,822,524 A * | 10/1998 | Chen et al. | 709/203 |
| 5,870,134 A | 2/1999 | Laubach et al. | |
| 6,230,200 B1 * | 5/2001 | Forecast et al. | 709/226 |
| 6,917,587 B1 * | 7/2005 | Sarkar et al. | 370/230 |

OTHER PUBLICATIONS

H. Schulzrinne et al; "Real Time Streaming Protocol (TRSP)", Online, Mar. 3, 2003, pp. 1-106.
Search Report Dated Oct. 6, 2004.

* cited by examiner

*Primary Examiner*—Kyung-Hye Shin
(74) *Attorney, Agent, or Firm*—Robert D. Shedd; Harvey D. Fried; Joel M. Fogelson

(57) ABSTRACT

It relates notably to a data requesting device from a data server, comprising means for sending requests of determined data to the server, means for receiving streamed data from that server and for providing said data to processing means, and means for producing pause control signals, intended for pausing data streaming, and for triggering their sending to the server. The requesting device comprises means for generating normal state signals, intended to the server for testifying normal operation at the requesting device, and for triggering periodic transmission of those signals to the server.

11 Claims, 5 Drawing Sheets

DATA REQUESTING AND TRANSMITTING DEVICES AND PROCESSES

The present invention relates, among other things and without restriction, to data requesting and transmitting devices and processes, notably for VOD (for "Video On Demand"), as well as to corresponding products.

According to existing techniques available for PCs (for "Personal Computers"), it is possible to order video and/or audio data (hereinafter noted "AV data") from a server through the Internet, by connecting a requesting PC to the server and giving thereto the IP (for "Internet Protocol") address of the PC. This is applied for example to trailers or advertisements. Those techniques, which rely on streaming, enable not only to download AV data in storing spaces for later displaying, but also to get the AV data at the same time as they are displayed.

A problem with existing techniques is that it cannot be sure that the data are well received and correctly exploited in due time by the receiver. Notably, if too many data arrive at a buffer of the receiver, overflow may arise. Also, if the transmission must be temporarily interrupted for avoiding overflow, it is not so practical to resume the transmission once the buffer is ready to receive next data, at the point transmission was interrupted. Further, if a failure takes place at the receiver, streaming risks to pursue, thus causing useless passband expenses.

Known technology consists in sending from the receiver to the server special control signals, for stopping, pausing or resuming the streaming.

Notably, document WO-9704585 relates to the transmission of MPEG encoded television signals from a VOD server to a receiver via a network. The receiver is enabled to order pause and resume, as well as slow motion, functions at the server side. Network aspects such as network latency and remultiplexing are taken into account by inserting position labels into the bit stream at positions where the server can resume transmission of the signal after an interruption. Upon a pause request, the receiver initially continues the reproduction until such a position label is detected. Upon a request to resume reproduction, the receiver requests the server to retransmit the signal starting at the detected position.

Such achievements however involve reliable communication between the server and the receiver, and fail when for any reason the receiver is not able to send the order in due time, or the server does not receive it accordingly. Then, transmission goes on though the streamed data are no longer exploited, which involves passband losses.

The present invention concerns a data requesting device enabling flexible obtaining of data, notably AV (Audio/Video) data, able to reduce sensibly the risks of undue data streaming in case of failures at the receiver side or within the communication network between the data server and the receiver (which may in particular apply to communications with a remote server through a WAN). The requesting device of the invention may notably allow to pause and retrieve a movie being played from such a server.

The invention also concerns a data requesting process, data transmitting device and process, and products, corresponding to that requesting device and able to offer similar advantages.

To that effect, the invention is related to a data requesting device as defined in claim 1.

Surprisingly, the invention relies on the combination of two different and complementary mechanisms, one based on special control signals for pausing the transmission, and another based on periodic signals (normal state signals) for indicating that no failure occurs at the receiver side, which may mean that the reception and exploitation of the streamed data are correct.

In this way, if a problem arises at the receiver and prevents normal exploitation of the streamed data, the periodic signal is no longer sent to the server, which leads to the server stopping any transmission to that receiver. On the other hand, the pausing in the data transmission by the server may be controlled by the receiver.

The server is thus liable to stop (temporarily or not) the data streaming in two different ways depending on the circumstances, in function of the return path information from the receiver.

The first and second communication networks used with the data requesting device may consist in a single bi-directional communication network. In various embodiments, they consist in WAN networks like for example the Internet, or in LAN networks (for "Local Area Network") such as for example home networks or networks used locally for Companies or for restricted geographic areas (e.g. for a building). Also, the first communication networks may comprise a broadcasting network for streaming the requested data and a bi-directional network (for example telephone link) to transmit control information.

The data requesting device is preferably compliant with any of dependent claims 2 to 7.

Notably, the production of the pause control signals at the data requesting device may in particular be triggered intentionally by a user via a user interface, or triggered automatically so as to avoid overflow in a central memory.

Also, the resuming of the data streaming after pausing at the server side may in particular be automatic after a given duration (that may notably be transmitted by a user within a pause control signal, for example a five minutes pause), or triggered by the sending of a resume control signal from the data requesting device.

The invention also concerns a decoder comprising a data requesting device according to the invention, and a data requesting process as defined in claim 8.

The invention further relates to a data transmitting device as defined in claim 10, and preferably to one of the embodiments mentioned in any of claim 9, and to a data transmitting process as defined in claim 11.

A further object of the invention is a computer program product comprising program code instructions for executing the steps of the data requesting process or the data transmitting process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the no limitative following examples of embodiments and of putting in practice, with reference to the appended figures on which:

Figure 4:
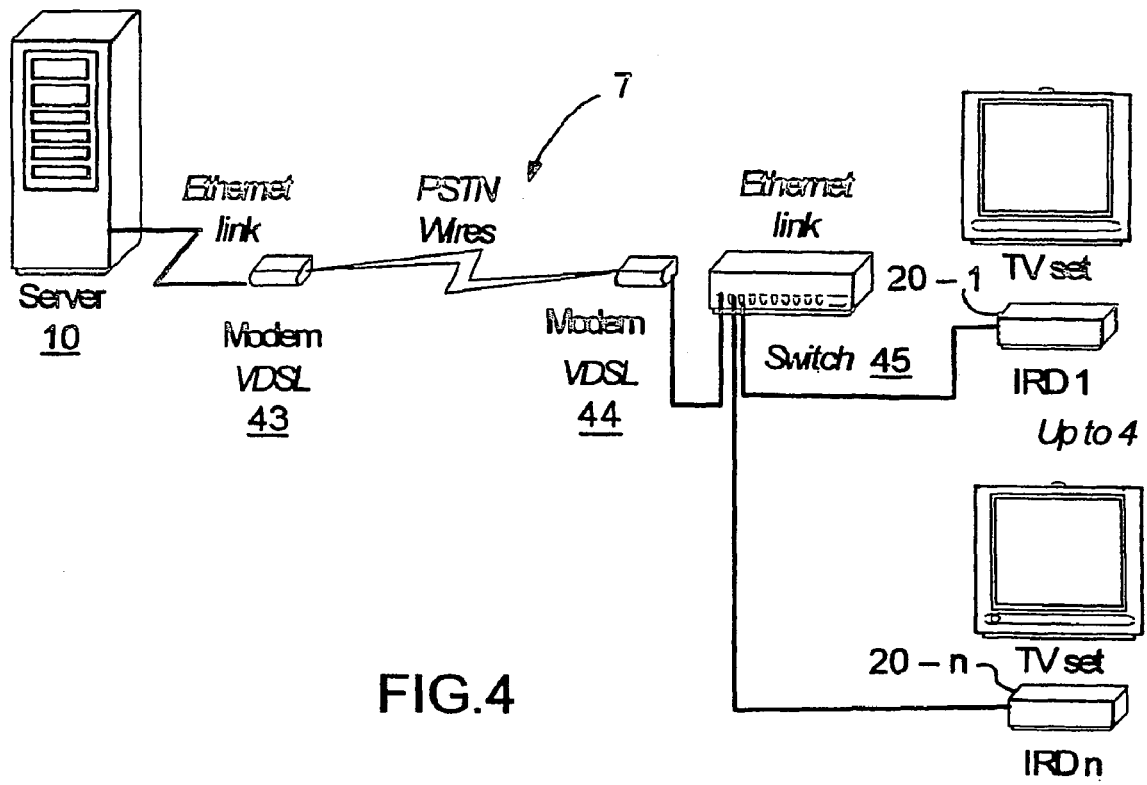
FIG. 4 shows a special embodiment of the communication environment of FIG. 1, in which the requesting devices are incorporated in IRDs (for "Integrated Receivers Decoders") and the transmitting device is incorporated in a PC server.
Figure 5:
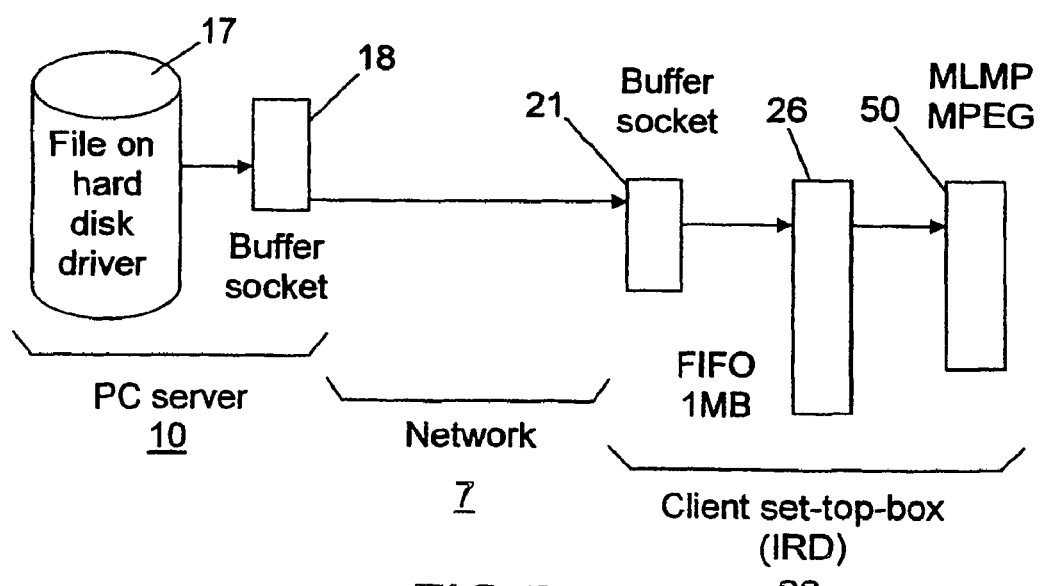
FIG. 5 represents pipes and buffers involved in streaming in the communication environment of FIG. 4.
Figure 6:
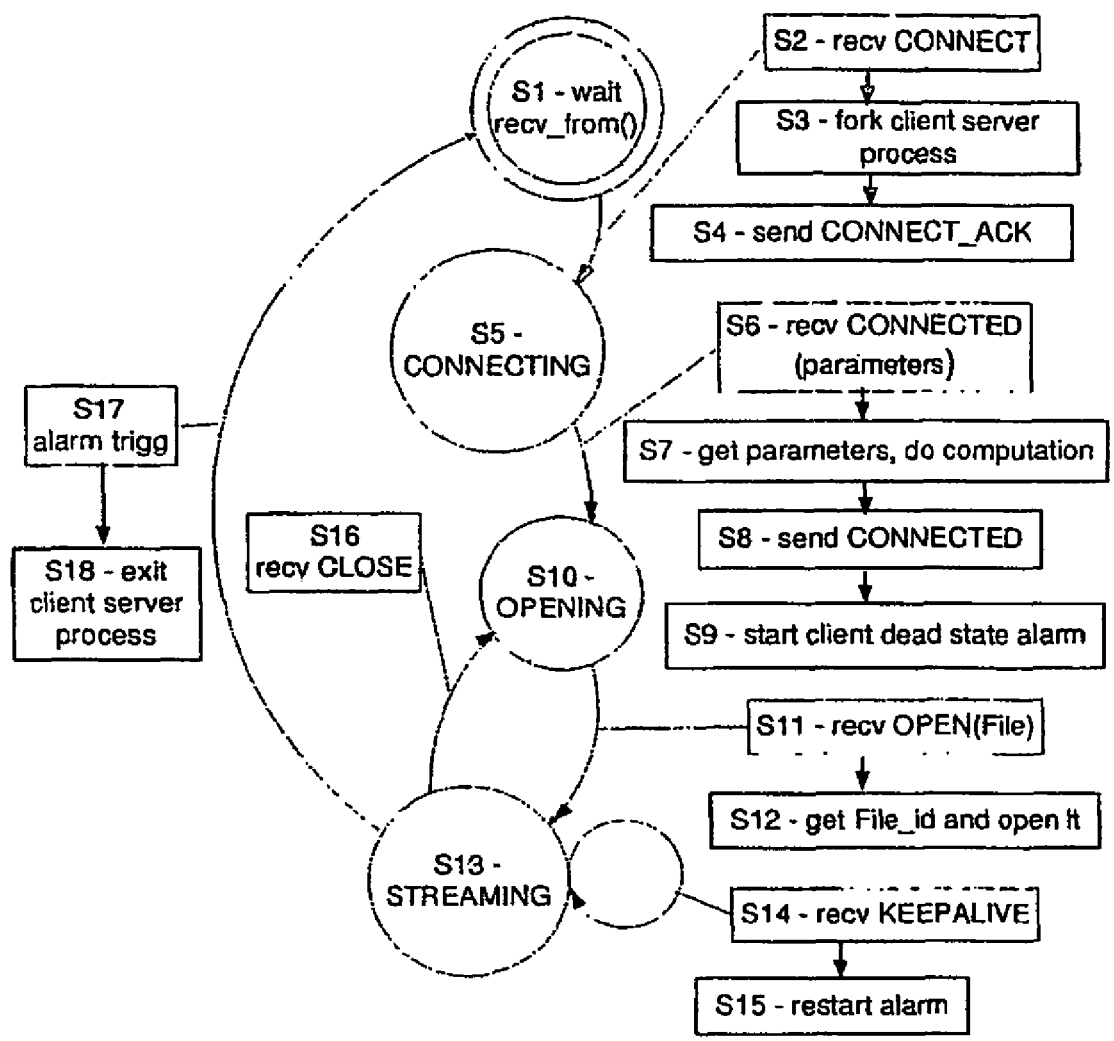
FIG. 6 is a protocol state transition diagram in the communication environment of FIG. 4, from server side.
Figure 7:
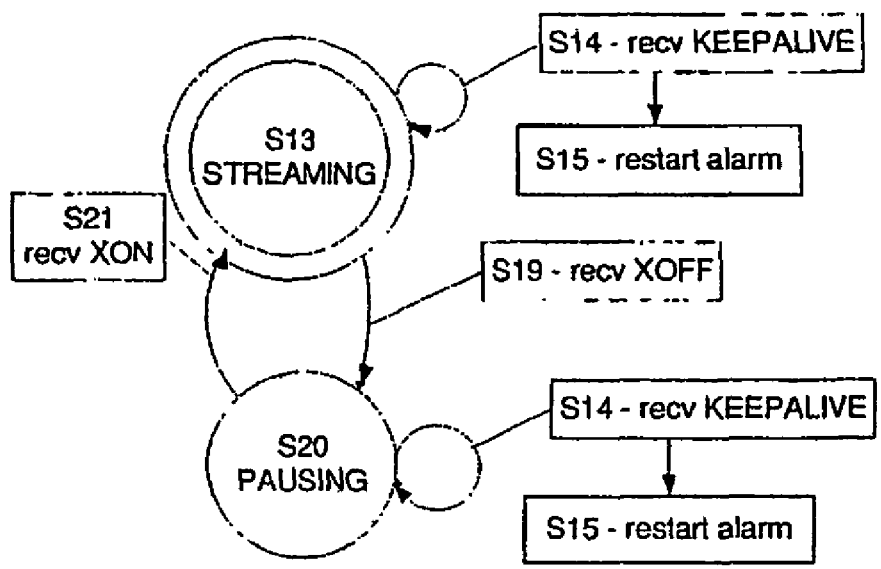
FIG. 7 is a streaming state transition diagram in the communication environment of FIG. 4, from server side.
Figure 8:
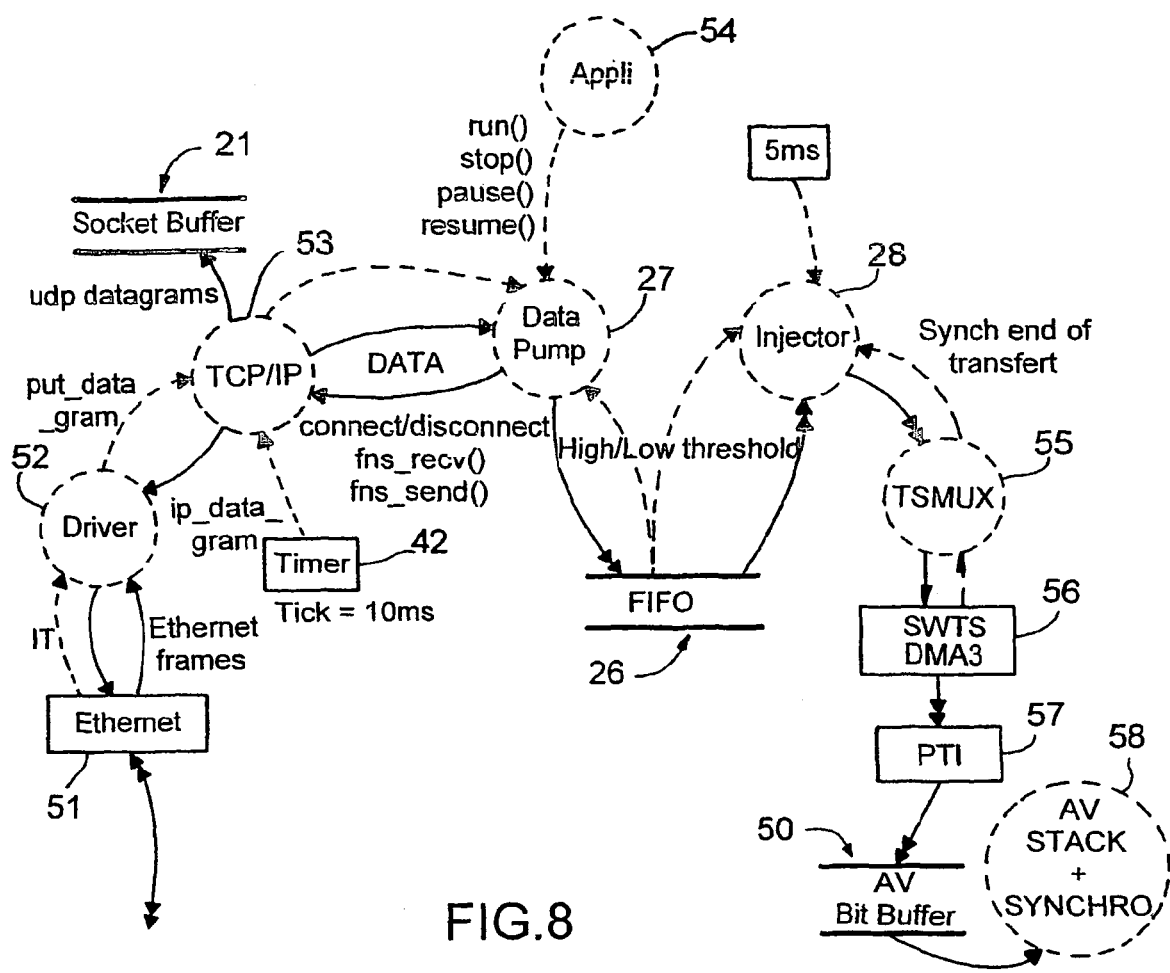
FIG. 8 represents a processing overview in the IRDs of FIG. 4.
Figure 9:
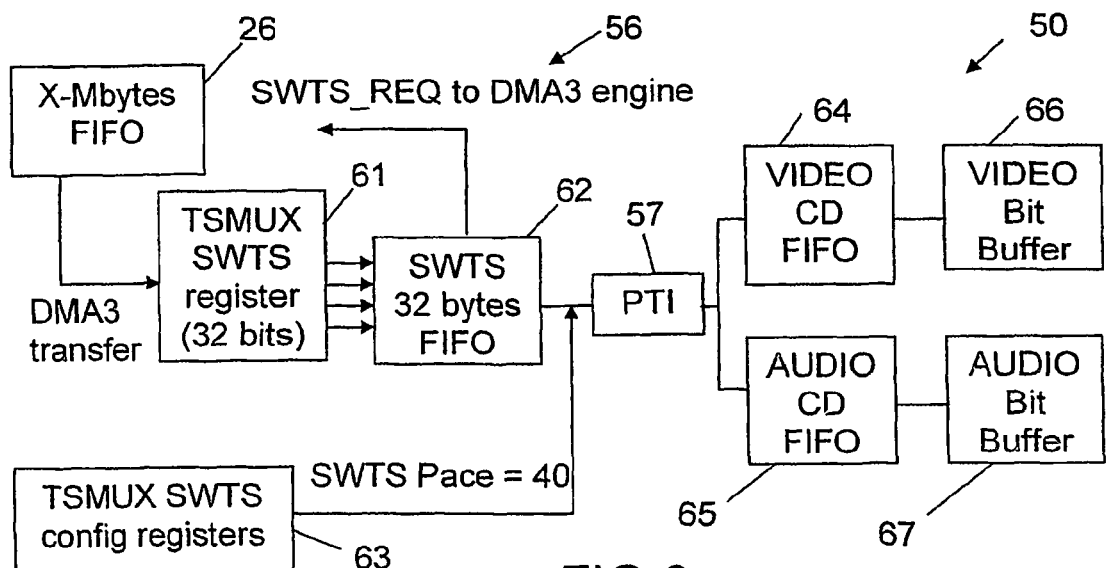

and FIG. 9 illustrates functionalities of an injector in one of the IRDs of FIG. 4.

Figure 2:
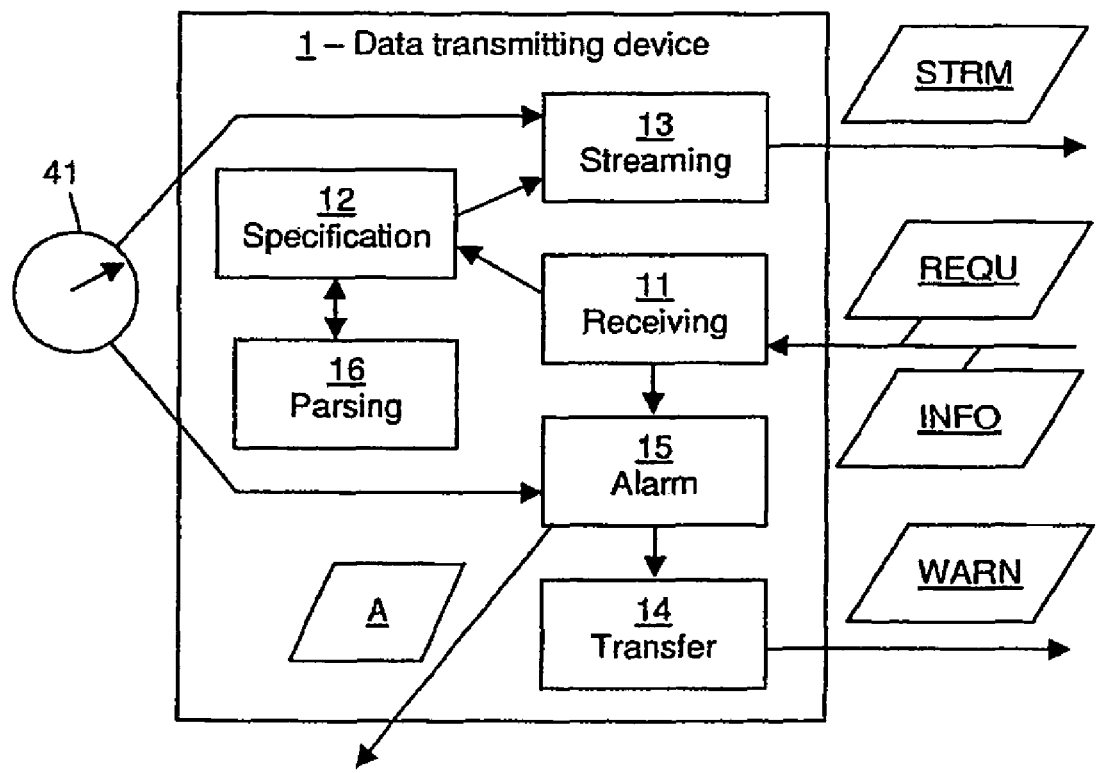
FIG. 2 is a block diagram of the data transmitting device of FIG. 1.
Figure 3:
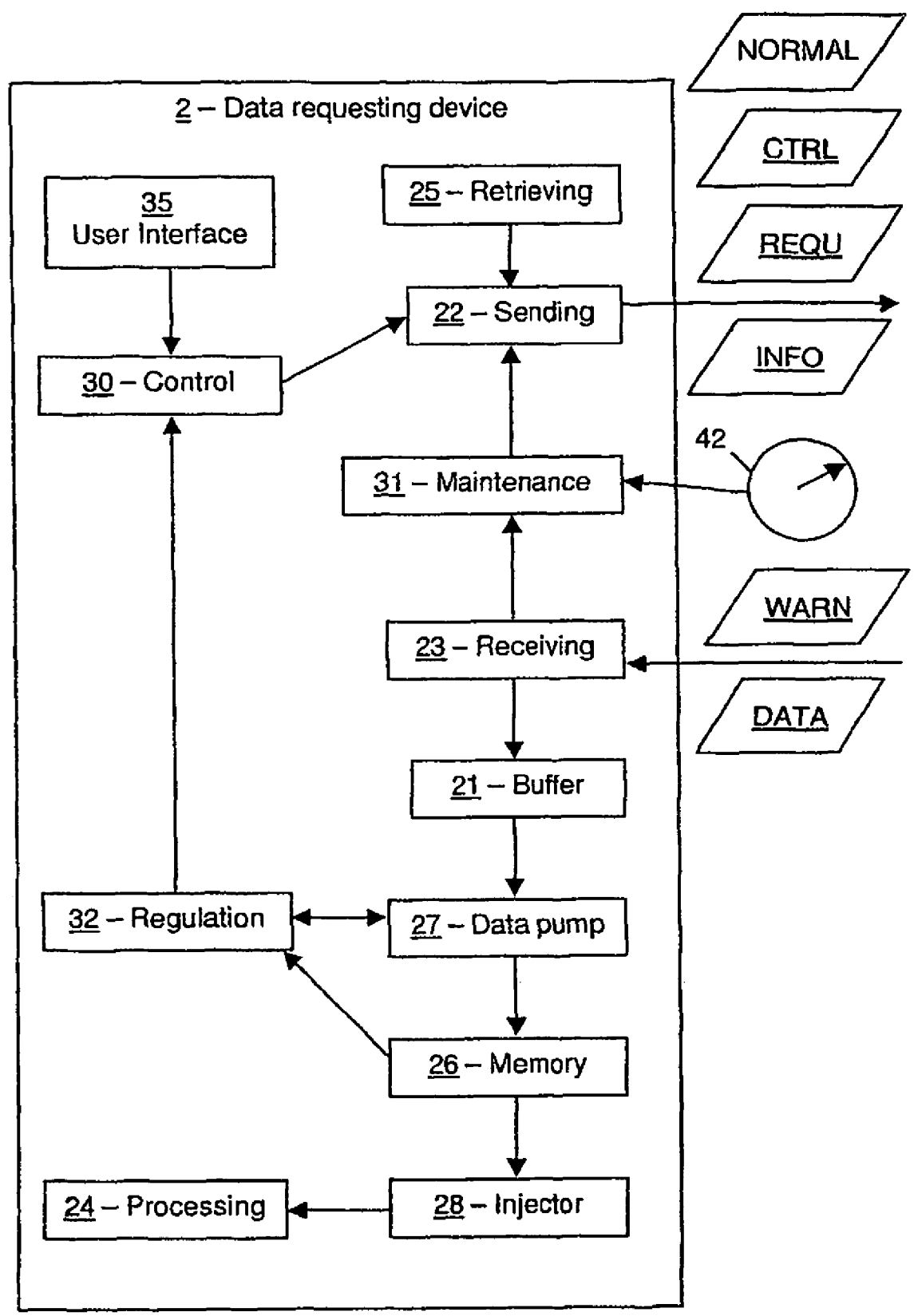
FIG. 3 is a block diagram of the data requesting device of FIG. 1.

In FIGS. 2 and 3, the represented blocks are purely functional entities, which do not necessarily correspond to physical separated entities. Namely, they could be developed in the form of software, or be implemented in one or several integrated circuits.

Figure 1:
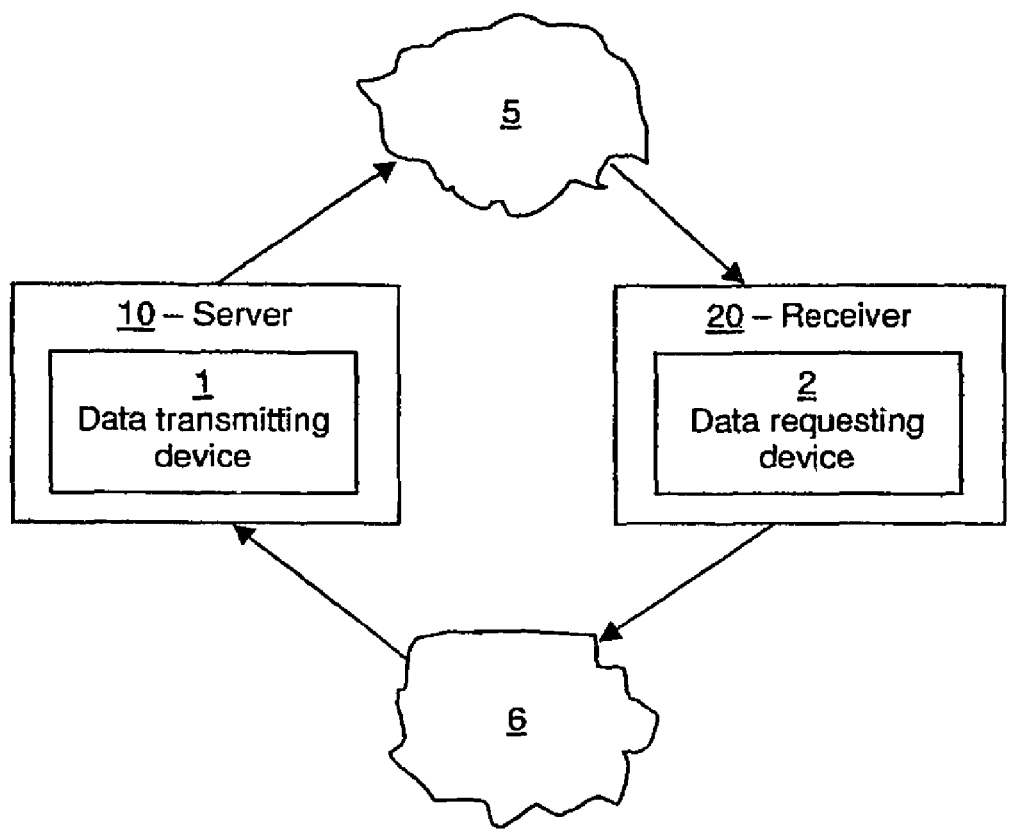
FIG. 1 shows a communication environment involving a server comprising a data transmitting device according to the invention, and a receiver comprising a data requesting device according to the invention.

A server 10 (FIG. 1) provided with a data transmitting device 1 is able to stream data to at least one receiver 20, provided with a data requesting device 2, through a first network 5. The receiver 20 is for its part able to transmit information to the server 10 via a return path through a second network 6. For example, the first network 5 is a broadcast network, which may rely notably on satellite, radio broadcasting, or cable, while the second network 6 is a telephone network. Both networks 5 and 6 may also be constituted by a unique bi-directional network, for example based on DSL communication (for "Digital Subscriber Loop").

The data transmitting device 1 of the server 10 (FIG. 2) comprises:
- a receiving module 11, intended to receive messages from the receiver 20; such messages may include notably data requests REQU, information INFO on the capacities of the receiver 20, normal state signals NORMAL sent periodically to the server 10 to check correct functioning at the receiver side, and control signals CTRL for modifying the data streaming modalities (notably for pausing or resuming transmission, for ordering slow or fast motion or reverse motion);
- a specification module 12, intended to determine a size of successive portions of data to be provided to the receiver 20 and a delay between two successive sending steps of those portions, in function of the information INFO; namely, the receiver 20 being able to support up to a maximum bandwidth rate and comprising an input buffer (or several input buffers), the information INFO relates to that maximum bandwidth rate and to the size of that input buffer (or the cumulated size of those input buffers);
- a streaming module 13 for triggering the streaming of the requested data, in the form of the data portions, by means of a control signal STRM; the periodicity in the streaming of the portions is ensured by means of a clock 41;
- a transfer module 14 for sending a warning message WARN to the receiver 20 when any of the normal state signals NORMAL is not received in due time;
- an alarm module 15 for triggering an alarm state when the normal state signals NORMAL are not received in due time, even after a warning message WARN has been sent;
- and a parsing module 16 used for fast motion and reverse motion interactively with the specification module 12, able to identify successive relevant places in the requested data for the wanted motion, the specification module 12 successively doing positioning at those places.

The data requesting device 2 of the receiver 20 comprises (FIG. 3):
- a sending module 22 for transmitting to the server 10 the request messages REQU, information INFO, normal state signals NORMAL and control signals CTRL;
- a receiving module 23, intended to receive notably the streamed data DATA from the server 10, and to transfer them to an input buffer 21 (or several such input buffers); the receiving module 23 is also provided for receiving notably from the server 10, the warning signals WARN;
- a processing module 24 for processing the received data DATA, for example by decoding video and audio streams;
- a retrieving module 25 able to retrieve the information INFO and to provide it to the sending module 22 for transmission to the server 10;
- a central memory 26 intended to store temporarily the data DATA transferred from the input buffer 21, before their transmission to the processing module 24;
- a data pump 27 intended to extract data available in the input buffer 21 and to transfer them into the central memory 26;
- an injector 28 intended to transfer the data from the central memory 26 to the processing module 24 when the data in the central memory 26 fill up to a predetermined middle threshold level of the central memory 26;
- a control module 30 able to produce control signals CTRL and to provide them to the sending module 22 for transmission to the server 10;
- a maintenance module 31 for generating the normal state signals NORMAL and for triggering their periodic transmission to the server 10 by means of the sending module 22; the periodicity in the sending of the normal state signals NORMAL is ensured by means of a clock 42;
- a regulation module 32 coupled with the data pump 27, intended to trigger the control module 30 to produce a pause control signal when the data in the central memory 26 exceed a predetermined high threshold level, and to produce a resume control signal when the data streaming has been previously paused by the regulation module 32 and the data decrease to a predetermined low threshold;
- and a user interface 35, enabling a user to trigger the control module 30 and the sending module 22, so as to cause the control signals CTRL to be provided to the server 10.

A detailed specific embodiment, with reference to FIGS. 4 to 9, will enable to better understand the functioning of the data transmitting device 1 and data requesting device 2 described above.

A communication environment (FIG. 4) comprising the server 10 and IRDs (IRD1 . . . IRDn) respectively noted 20-1 . . . 20-n (each of them being similar to the receiver 20 above, the reference "20" being used below as a generic notation) communicate through PSTN wires (for "Public Switch Telephone Network") which constitute both networks 5 and 6 (same networks) as a PSTN network 7. That environment provides a real video streaming system fitting on the Internet world. The server 10 is connected to a first VDSL modem (for "Very high speed Digital Subscriber Loop") 43 by means of an Ethernet link, while the IRDs are for instance respectively associated with TV sets and are connected to a second VDSL modem 44 via a switch 45, through an Ethernet link.

The VDSL modems 43 and 44 enable a high bit rate, up to 60 Mbit/s. Thus, the described communication environment offers a real Video-On-Demand system, where end-users may choose their dedicated programs from a catalogue, and ask for playing and pausing them, without useless bandwidth usage.

As an example, the described communication environment comprises set-top-boxes (hereinafter "STBs") 20-1 to 20-*n* with LAN connectivity (for "Local Area Network") constituting the IRDs, VDSL modems 43 and 44, and a PC server 10 based on the Linux technology. Of course, an operating system other than Linux could be used.

Each of the IRDs comprises a requesting device 2, while the server 10 comprises an associated transmitting device 1.

In variants:

ADSL (for "Asymmetric Digital Subscriber Loop") modem technologies and multicasting are used instead of the present VDSL modem embodiments, 'x'DSL in general providing other possibilities (HDSL—for "High-data-rate DSL", 10MDSL—for "10 Mbits/s DSL", ADSL2 . . . );

USB (for "Universal Serial Buses") connectors instead of Ethernet links at the users side (other connection means, e.g. directly on the bus are also possible);

and/or only one IRD is present at the user side, which is directly connected to the second VDSL modem 44.

A/System Description: Specificities

The main requirement is to serve on request a video/audio stream to a user. The limit is fixed to up to 5 simultaneous streams according to the present embodiment. In other embodiments, there may be a different limit, or no limit at all.

The end-users of the TV sets have notably the capability to choose one program from a catalogue, play it, stop it and pause/resume it.

A1/Network

The VDSL modems 43 and 44, as the ADSL ones, use the actual user local telephone line. They have Ethernet or USB (for "Universal Serial Buses") connectors.

The transport format is an MPEG2 (for "Moving Picture Experts Group") SPTS (for "Simple Program Transport Stream"), several audio information sets being possibly transported for language purpose. In this way, the STBs have naturally the capability to play this type of stream easily.

At the server side, the PC 10 is connected through an Ethernet 100BT link (for "100Base-T") to the modem 43.

At the user side, the STBs (up to four) are connected through an Ethernet 10BT link to the switch 45, which is a 100BT/10BT switch. Any of the users may then share its VDSL line for different usages, like a home PC, other room STBs, and so on. Also, by using the switch, the collision spaces are split, thus no collision propagation may occur.

In the illustrated example, a specific protocol above UDP (for "User Datagram Protocol") protocol stack is used. Advantages of that solution (insofar as the links are fair enough), rely on the bandwidth delay introduced by the modem and on the current availability of STBs for which the Ethernet interface has only half-duplex capabilities; then, there is no need of a more complicated and less efficient protocol. Namely, experimentation shows that TCP (for "Transmission Control Protocol" protocol stack has real limitation with this network environment, even using the so-called "Window Scale Option".

A2/Server 10

Based on Linux, it:

includes a DHCP server (for "Dynamic Host Configuration Protocol") intended to setup the end-users IP (for "Internet Protocol") addresses;

runs the application as a daemon;

gives access to a catalogue of programs, each program being a file based on the server hard disk drive;

streams the file based on the developed protocol;

manages the user connection/disconnection states, as well as user dead state; a known port is used.

The server 10 is advantageously in a central office, just linked to DSLAM (for "Digital Subscriber Line Access Muitiplexer"). Its catalogue is then managed by operators in an efficient way (refresh method, cache algorithms . . . ).

A3/Set-Top-Boxes 20-1 . . . 20-*n*

They are able to:

choose one program from a list;

start that program by pressing a "Run program" button;

pause/resume the program by pressing a "Pause/resume program" button;

zap to another program;

decode correctly and synchronize audio and video, accept intrinsic video bit rate from flow server up to 5 Mbits/s.

B/The Protocol

B1/Specificities

The server 10 and STBs 20-1 . . . 20-*n* are connected each other on TCP/IP LAN. In practice (FIG. 5), one of the STBs 20 connects socket to server 10 and requests an audio/video file. The server 10 then puts that file from a hard disk driver 17 through a buffer socket 18 in a loop process only ended by a later STB request.

The file is transmitted via the network 7 to the socket buffer 21 of the STB 20. From there, it is transferred to the central memory 26 constituted here by a FIFO (for "First In, First Out") having for example a size of 1 Mbyte, and then to an MPEG MLMP buffer 50 (for "Main Level Main Profile").

File transfer protocol, specifically designed, allows:

query for available catalogue;

connecting for stream transfer parameters setup;

opening/closing a file;

a streaming an MPEG2-SPTS file, taking into account client data consumption;

possibly indexing the file;

checking for a client dead state.

The protocol is built to:

transfer streamed data, thus no data recovery is needed;

work on a fair network, i.e. without data loss, which is the case in the present system since no collision occurs because of the used modems and switch;

work with long fat pipes, i.e. a lot of data stored either in the network, or in client buffers.

This makes UDP quite appropriate as lower protocol.

The system may be seen as If a client (namely at one of the IRDs) requests data from a storage medium, which here is in a network. Thus, the client regulates the data streaming, according to the MPEG decoding processes.

Server Computations

The protocol being based on UDP, and the server 10 having big bandwidth capacity, the server has to take care not to overflow the client. Parameters are given by the client at a setup time to ensure this. These parameters are:

client max supported bandwidth rate: CBW; that rate involves capacities of the receiving STB 20 as a whole, and is notably linked to the rate of extracting the received data from an input socket buffer (or possibly from several input socket buffers);

client input socket buffer size: CSOCKBUFSZ; in the case of several input socket buffers, between which the incoming data are shared, the parameter CSOCKBUFSZ is given by the cumulated size of those buffers;

and client keep alive message repeat period; such a message is intended to be periodically sent from the STB 20 to the server 10—for example every 5 seconds, so as to warn the latter that the STB 20 is correctly working and exploiting the streamed data; its missing is interpreted as a failure or a dead state of the STB.

The server 10 streams data according to these parameters. It computes a value "UNIT_SIZE", giving a size of the portions to be sequentially sent to the requesting STB, from the socket buffer size. In an advantageous example, that value is given by:

UNIT_SIZE=CSOCKBUFSZ/8.

The factor "8" enables to have portions of small sizes at the server side, which proves to fragment efficiently the streamed data. Namely, the probability of overflow at the receiving side becomes very low, and the high partitioning may improve share pass band with respect to other streams. Lower factor is however possible (up to 2 for example), as well as higher factor if the server enables it.

The server 10 loops sending data putting a ceiling corresponding to that value (looping "UNIT_SIZE" by "UNIT_SIZE"), and inserting a delay in order to not override the CBW bit rate. A period "PERIOD" for sending the successive data portions is defined as

PERIOD=UNIT_SIZE/CBW.

That period is typically much shorter than the keep alive sending period.

Client Computations

Two parameters are computed by the client in order to pause/resume data transmission without any hole in the needed bandwidth for streaming a file. These parameters are giving thresholds of a filling level in the central FIFO memory 26 of the STB 20, having a size "FIFO-SIZE", intended to temporally store the data coming from the input buffer 21, before their processing. On one hand, a low FIFO threshold "LFIFO" gives a downward limit for ordering resuming of data streaming when it has been paused, by means of a specific message thereto called "XON". On the other hand, a high FIFO threshold "HFIFO", gives an upward limit for pausing the data streaming from the server 10 when that threshold is exceeded in spite of data processing, by means of specific message thereto called "XOFF".

Both threshold values LFIFO and HFIFO are chosen so that:

LFIFO<=HFIFO
FIFO-SIZE−HFIFO>=CBW*RTT/2
LFIFO>=CBW*RTT/2 where "RTT" is the Round-Trip-Time, namely the delay between sending a packet and getting its acknowledgement (the size of the FIFO is big enough so that: FIFO-SIZE>CBW*RTT). This time is measured by the client at the setup time, and may be reevaluated in a periodic basis. It is representative of the amount of data possibly remaining to be received in the network when communication from the server is interrupted.

Input Socket Buffers 21

These input buffers are embedded with UDP/IP stack. They are large enough to not overrun the STB 20. The server 10 computes its streaming portion according to the client socket buffer size.

Central FIFO 26

This central buffer 26 is used to deal with burst side-effects. The client starts decoding only when this FIFO has enough data, which is determined by means of a third FIFO threshold, which is a middle threshold "MFIFO" having a value comprised between low and high thresholds LFIFO and HFIFO. That threshold MFIFO for triggering processing of the data (transfer to processing unit is in an efficient embodiment equal to the low threshold LFIFO. As mentioned above, the client also pauses the server streaming when the FIFO is full (threshold HFIFO), and resumes the server streaming when the FIFO is low (threshold LFIFO).

The pausing and resuming above are respectively done by means of the XOFF and XON messages sent to the server 10 from the STB 20. The same signals may be used by the client to decide at any moment to pause the streaming and later to resume it.

Further, in the advantageous achievement described here, the keep alive messages continue to be sent regularly and checked by the server, even during a pause state.

In a first specific implementation, the thresholds are chosen with the following values:

LFIFO=MFIFO=¼FIFO-SIZE; HFIFO=¾FIFO-SIZE.

With FIFO-SIZE being worth 1 Mbytes, this gives:

LFIFO=MFIFO=250 kbytes, HFIFO=750 kbytes.

Now, in the case the data are received at the streaming rate of CBW=6 Mbits/s and the data processing rate is a decoding rate which corresponds to an encoding bit rate "EBR" equal to 4 Mbits/s, streaming periods ("XON") of 2 seconds alternate with pause periods ("XOFF") of 1 second. Indeed, the effective filling rate of the FIFO when streaming is on is (CBW-EBR) (here 2 Mbits/s), while the emptying rate when streaming is off is EBR (here 4 Mbits/s).

In a second specific implementation, the thresholds are chosen with following values:

LFIFO=MFIFO=CBW*RTT/2
HFIFO=FIFO-SIZE−CBW*RTT/2

With FIFO-SIZE=1 Mbytes and RTT=100 msec, this gives:

LFIFO=MFIFO=39,321 bytes, HFIFO=960,679 bytes.

Now, in the case the streaming rate is CBW and is worth 6 Mbits/s and the processing rate is EBR equal to 4 Mbits/s, streaming periods of 7.4 s alternate with pause periods of 1.85 s.

MLMP MPEG Buffers 50

These buffers are provided for correctly decoding an MPEG2 PES (for "Packet Elementary Stream") stream. The STB embedded audio/video decoder stack is used. The Main-Level/Main-Profile is implemented.

Because there is no encoding process at server side, the PCRs (for "Program Clock References") are not managed, but the local VCXO (for "Voltage Control Crystal Oscillator") is set to 27 MHz. In any way, audio is synchronized on video using video and audio PTSs (for "Program Time Stamps"). The decoding processes is buffer-underflow tolerant, and does not reset or flush the MLMP buffers 50 on errors.

B2/Protocol Stack

The protocol and streaming state transition diagrams are respectively represented on FIG. 3 and FIG. 4, from server side.

Protocol stack used is as follows:

| Layer | Protocol |
| --- | --- |
| 5/7 (application) | Application specific socket |
| 4 (transport) | UDP |
| 3 (network) | IP |
| 2 (link) | Ethernet |
| 1 (physical) | Ethernet 802.3 |

Socket is open over UDP protocol.

B3/Application Protocol

Process is cut in the following steps:

create socket;

application layer process comprising:
  initialize exchange: "Open Stream",
  exchange: "Write/read Stream",
  end exchange: "Close Stream";
and close socket.

Packets built in application layer are messages. All messages have a generic format:
  header:
    message type (1 long),
    up to four optional parameters (4 longs);
  data: a piece of the stream or empty for signalization messages.

All data types are network aligned, that is big-endian (MSB, for "Most Significant Bit").

The main protocol operations from server side are as follows (FIG. 6, where "recv" stands for "receive"):
  wait for receiving message from one of the STBs (step S1);
  receive a connection message "CONNECT" from one of the STBs (step S2);
  fork client server process (step S3);
  send connection acknowledgement CONNECT_ACK (step S4);
  connect to the requesting STB (step. S5) by receiving connection parameters from the STB (step S6), getting parameters and doing corresponding computation (step S7) and sending connection message (step S8);
  start client dead state alarm for checking that the requested STB remains correctly in relation with the server (step S9); this is checked through the periodic reception of keep alive messages "KEEPALIVE" having a predetermined sending period (for example 5 s);
  open the file targeted by the STB client (step S10), by receiving an opening message indicating the relevant file "OPEN(file)" (step S11), getting a corresponding file identifier File_id and opening it (step S12);
  stream the file to the requesting STB client (step S13), while periodically receiving keep alive message (step S14) and restarting alarm accordingly (step S15), up to the end of the file transmission;
  stopping the file transmission when receiving a closing message CLOSE (step S16);
  in case of an alarm triggering (step S17) due to no reception of the keep alive message in due time, exit client server process (step S18).

The streaming operations from the server side are as follows (FIG. 7):
  proceed with data file streaming (step S13) as long as keep alive messages are received (step S14) so that alarm is restarted (step S15) and as long as the file is not completely transmitted; the non reception of the keep alive messages in due time leads to alarm triggering (step S17), as seen above;
  when receiving special interruption messages "XOFF" (step S19), pausing the streaming (step S20), while continuing to check received keep alive messages (step S14) and consequently restarting alarm (step S15);
  when later receiving special resumption messages "XON" (step S21), resuming the file transmission (step S13) at the point it was previously interrupted;
  whether the streaming is currently done or is paused, exiting the client server process in case the keep alive message is not received in due time.

Thanks to that process, the server 10 is able to be quite adapted to the receivers 20 specificities for the video streaming. Further, that process may possible to use only the bandwidth that is effectively necessary for the client to really exploit the streamed data.

In an advantageous embodiment, the time limit for triggering the alarm is given by the expected period time increased by a duration depending on the round-trip time RTT, for example three or four RTT.

In an improved version regarding the checking at the server side of correct reception of the streamed data at the client side, the alarm is only triggered in case no keep alive message is received for a duration sensibly longer than the keep alive period, for example during three time that period. This enables to take into account possible delays in the transmission between the STB and the server.

According to a further improvement in the checking method, once the expected time for receiving the keep alive message at the server side has passed and no such message has arrived, the server warns the client STB, which then immediately sends back again a keep live message if still in an active reception state. This improves the reliability of the system, by considerably decreasing risks of erroneous interruptions of the streaming process due to transmission problems in the network, notably due to packet loss.

Both features above (determination of the critical time and warning messages) are advantageously combined.

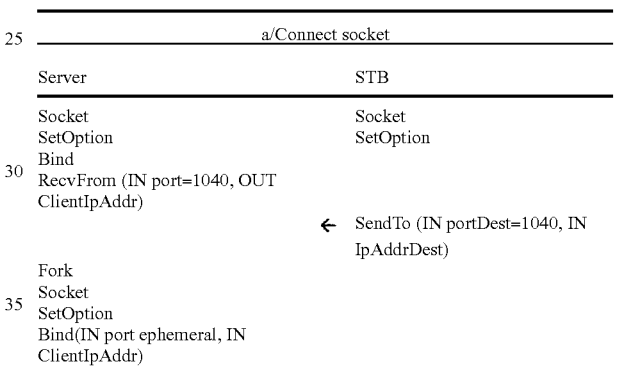

a/Connect socket

| Server | STB |
|---|---|
| Socket | Socket |
| SetOption | SetOption |
| Bind | |
| RecvFrom (IN port=1040, OUT ClientIpAddr) | |
| | ← SendTo (IN portDest=1040, IN IpAddrDest) |
| Fork | |
| Socket | |
| SetOption | |
| Bind(IN port ephemeral, IN ClientIpAddr) | |

IP addresses are constants b/Initialize connection

| Server | STB |
|---|---|
| Read(. . .) | ← Write(AL_CONNECT) |
| Write(AL_CONNECT_ACK) | → Read(. . .) |
| | Compute RTT |
| Read(. . .) | ← Write(AL_CONNECTED, CBW, CSOCKBUFSZ, KEEPALIVE repeat period) |

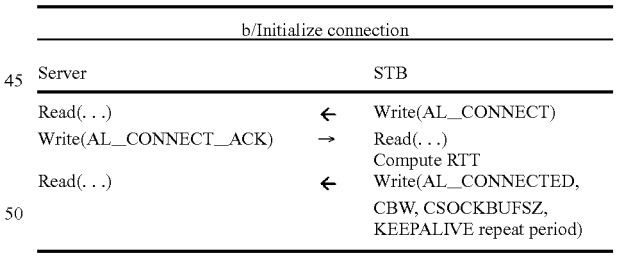

| AL_CONNECT = 0x03 (1 long) | Unused (4 longs) (4 longs) |
| AL_CONNECT_ACK = 0x04 (1 long) | Unused (4 longs) (4 longs) |
| AL_CONNECTED = 0x05 (1 long) | Client max bitrate (CBW) in Kbit/sec (1 long) |
| | Client buffer socket size (CSOCKBUFSZ) in bytes (1 long) |
| | Client keep alive message (KEEPALIVE) repeat period in msec (1 long) |
| | Unused (1 long) (4 longs) |

| c/Open/close a stream | |
| --- | --- |
| Server | STB |
| Read(...) | ← Write(AL_FILE_LIST) |
| Open file | |
| Write(AL_FILE_LIS_ACK, DATA_PACKET_LEN) | → Read(...) |
| Write(AL_FILE_LIST_DATA, ...) | → Read(...) |
| Wrtie(AL_FILE_LIST_DATA, ...) | → Read(...) |
| ... | → ... |
| Read(...) | ← Write(AL_OPEN, file_index) |
| Read(...) | ← Write(AL_CLOSE) |
| Close file | |

| | |
| --- | --- |
| AL_FILE_OPEN = 0x01 (1 long) | File index in the catalogue (1 long) Unused (3 longs) (4 longs) |
| AL_CLOSE = 0x02 (1 long) | Unused (4 longs) (4 longs) |
| AL_FILE_LIST = 0x01 (1 long) | Unused (4 longs) (4 longs) |
| AL_FILE_LIST_ACK = 0x04 (1 long) | Number of AL_FILE_LIST_DATA packets following in the stream (1 long) Unused (3 longs) (4 longs) |
| AL_FILE_LIST_DATA = 0x04 (1 long) | Catalogue description data, format to be defined (4 long) (4 longs) |

| d/Streaming | |
| --- | --- |
| Server | STB |
| Write(stream_data) | → Read(...) |
| Write(stream_data) | → Read(...) |
| ... | ... ... |
| Read(...) | ← Write(AL_KEEP_ALIVE) |
| Restart timer alarm | |
| Write(AL_KEEP_ALIVE_ACK) | → Read(...) |
| Restart timer alarm | Compute RTT |
| Write(stream_data) | → Read(...) |
| Write(stream_data) | → Read(...) |
| ... | ... ... |
| Read(...) | ← Write(AL_XOFF) |
| Pause streaming | |
| Wait for XON | |
| Read(...) | ← Write(AL_XON) |
| Resume streaming | |
| Write(stream_data) | → Read(...) |
| Write(stream_data) | → Read(...) |
| ... | ... ... |

| | |
| --- | --- |
| AL_KEEP_ALIVE = 0x08 (1 long) | Unused (4 longs) (4 longs) |
| AL_KEEP_ALIVE_ACK = 0x0B (1 long) | Unused (4 longs) (4 longs) |
| AL_XOFF = 0x07 (1 long) | Unused (4 longs) (4 longs) |
| AL_XON = 0x06 (1 long) | Unused (4 longs) (4 longs) |

| e/End exchange and close sockets | |
| --- | --- |
| Server | STB |
| Alarm triggers because of no keep alive message | ... Exit, standby or crash |
| Close socket | ... |
| Exit rocess | |

C/Set-Top-Boxes 20

Once one of the STBs 20 sends "AL_OPEN" message, it waits until the server 10 sends stream data packets (reception is non blocking). The STB 20 reads as much as possible data from the socket, and releases the CPU (for "Central Processing Unit") for injection and decoding processes to be scheduled. One suitable algorithm consists in reading half buffer socket size at each schedule of the data pump 27, the latter being part of the requesting device 2 incorporated in the STB 20.

With presently available STB designs, the maximum measured sustained bit rate is around 6 Mbit/s, which is high enough for good MPEG2 video and audio quality.

The data pump 27 gives directly to the input socket buffer 21 the "Write" pointer of the central FIFO 26 and the contiguously available space of that FIFO (this avoids intermediate copy from socket buffer to FIFO buffer).

The volume of data taken during each transfer from the central FIFO 26 for processing, given by a "LenAsked" value, is half FIFO size and avoids heavy scheduling works. After such a FIFO transfer is fulfilled, LenAsked is the contiguously available size according to consumer pointer. The injector 28 being part of the requesting device 2 is intended to manage ft.

If the user zaps from one flow to another, the socket, the FIFO 26 and the bit buffers 21 may be flushed.

The server 10 does not anticipate the read file. The read length and sent length are constant and smaller than internal input socket buffer 21 (CSOCKBUFSZ) in order to avoid burst transfers: protocol also regulates transmit rate with respect to consumer rate (CBW parameter: central FIFO 26 managed by data pump 27 on STB 20).

The IRD processing overview is explained below (see FIG. 8), the various described elements being parts of the IRD requesting device.

Zapper ("Appli") 54: gets user input selection (program identifier), runs the data pump 27, injector 28 and starts AV decoders; if the user changes program, the zapper stops data pump 27 and injector 28 before running them again. The video decoder does not need to be stopped.

Ethernet driver 52: interfaces TCP/IP stack 53 to a physical Ethernet controller 51, which is for example the one commercialised as "CS8900A" by the Company Cirrus Logic. The rate is comprised between 3 Mbit/s and 6 Mbits. So, if the rate is 4 Mbit/s, one frame (1460 bytes) is processed in 2.86 ms. Interruptions process ("IT") is provided for warning the driver 52 of control data transmission.

TCP/IP stack 53: TCP/UDP/IP stack 53 over Ethernet, with socket non-blocking API (for "Application Programming Interface"). A DHCP client (for "Dynamic Host Configuration Protocol") is embedded in order to get an IP address dynamically. The TCP/IP stack 53 makes use of the socket buffer 21, having 64 kbytes max, and of a timer 42.

Data Pump 27: uses a UDP port in order to get MPEG2-TS (for "Transport Stream") data from the server 10. In operation, the file identifier is specified by the user and transmitted directly to the server 10 during connection. Once connected to the server 10, the data pump 27 reads the available FIFO length and asks the server 10 to pause the data streaming (XOFF message) when the FIFO 26 is nearly full (HFIFO threshold), and to resume it when the FIFO 26 is nearly empty (LFIFO threshold). It allows also the user to zap thus to flush the FIFO 26. The flush method is then propagated to the injector 28.

Central FIFO 26: X Mbytes FIFO (for example 1 Mbyte), used to regulate the decoding process and the streaming process, and to deal with network bursts. A FIFO manager manages the three thresholds, the low one LFIFO and high one HFIFO respectively triggering and pausing the injector process, and the middle one MFIFO triggering the data pump process.

For transmissions, a unit size of 32 kbytes is for example chosen (with a unit size of 50 kbytes, a transmission takes 20 ms). Namely, considering a rate of 4 Mbits/s, it takes 2 seconds to fill the central FIFO 26, a full FIFO corresponding also to 2 seconds decoding.

Taking a chunk of 8 kbytes in the server file, it takes 16 msec to reach the client socket buffer. The same data are transferred into the FIFO 26 at an approximate rate of 2 to 4 kbytes/msec, depending on the CPU embedded in the STB. Thus, the STB transferring process is negligible.

The central FIFO 26 absorbs the possible jitter from the server 10 and the network. Preferably, the bandwidth rate CBW of the client is greater than the encoding rate EBR. In cases where the values of EBR and CBW are close, the FIFO 26 may be smaller.

Injector 28: The notion of flow control between the PC server 10 (producer) and the decoding process (consumer) is computed here: once started, the injector 28 polls a video bit buffer level and injects via a DMA (for "Direct Memory Access") to a TSMUX (meaning "Transport Stream Multiplexer") 55, using SWTS input (for "Software Transport Stream") 56, a given quantity of FIFO data. The central FIFO 26 must then have sufficient data.

TSMUX 55: based on registers 61 (FIG. 9) like those commercialised as "ST5516" by the Company ST Microelectronics, this interface permits injection of data from memory to a PTI (for "Programmable Transport Interface") 57 in SWTS mode (using configuration registers 63). It stores temporally data in its internal 32-byte SWTS FIFO 62 and streams them out to the PTI 57. Speed of byte transfer can be adjusted. The pace rate is worth for example 40 Mbits/s.

AV stack 58: audio and video decoding process; allows to setup the decoding processes, directed to the targeted PID (for "Packet IDentifier") for decoding. It enables to start the decoding processes, and to indicate video bit buffer level (noted "VBBL")—the bit buffers are underflow tolerant.

AV synchronisation: it is based on PTS values (for "Program Time Stamps") from Video and Audio. No PCR is managed so that the 27 MHz VCXO has a fixed command value. Video decoding process starts and initializes an STC value (for "System Time Clock") with the first Video PTS. Audio skips frame until its PTS value is near STC value.

C1/Injector 28

The injector 28 and its functions are now detailed (with reference to FIG. 9).

Injection of data to SWTS input 56 is paced using a "SWTS_REQ" signal that is routed through the PTI "DMA3" channel. That SWTS_REQ signal is asserted when the internal SWTS FIFO 62 has room for at least 16 bytes. Each time the SWTS_REQ is low and there is data to be read from the X-Mbytes FIFO 26, a programmable number of bytes is transferred to the SWTS input 56. At the end of the complete transfer, an interrupt is set to signal injector task that data have been transferred.

In case of the SWTS entry, the destination pointer is fixed in video and audio compressed data FIFO, respectively noted 64 and 65: that injection is processed like "CD_FIFO". A SWTS register address replaces CD_FIFO address and no increment is programmed directly by "PTI_DMA3SETUP" register (so: "DMA3BLOCKMOVE=0").

PTI 57 Version Driver

The PTI driver is able to provide software support for DMA injection. It runs in "PTI3" hardware used in "PTI1" backwards compatible mode. In the presented embodiment, the only restriction is that interrupt mode is not allowed for signalling DMA transfer end: the call to the "pti_data_dma_synchronize" function blocks until the end of the DMA transfer.

Interconnecting PTI DMA3 with TSMUX 55

The "SWTS_REQ" signal is multiplexed to the "PTI NOT_CDREQ3" signal by configuring "CONFIG_CONTROL_A" register (namely: "PTIA_CDREQ3 _ MUXSEL [3:01]=TSSUB_SWTS_REQ").

The injector task needs to know the level of occupation of Video and Audio bit buffers respectively noted 66 and 67, before injecting data in the PTI 57. Supposing that each stream contains a video and an audio component and audio bit buffer 67 capacity is sufficient to avoid overflow and underflow, monitoring only video bit buffer level may be acceptable.

To do this, a "VID_VBL" register is read, which gives the current level of Video bit buffer 66 in units of 2 kbits (256 bytes). The size of free space in this buffer is then immediately deduced. The injector task starts DMA transfer from user central FIFO 26 to the PTI 57 through the TSMUX 55, the size of transfer being:

min(RVBB, central FIFO available data)

where RVBB ("Remaining space in Video Bit Buffer") stands for the remaining free space in the VBB ("Video Bit Buffer") 66.

Thus, the transfer is computed taking into account only VBB 66. This implies that the ABB (for "Audio Bit Buffer") 67 is large enough to not overflow.

For a flow at 4 Mbits/s (500 kbytes/s), the transfer of 50 kbytes of data appends every 100 ms. According to SWTS pace rate fixed to 40 Mbits/s (5 Mbytes/s), the transfer duration takes at least 10 ms. So, the corresponding thread sleeps for 90 ms between each transfer.

C2/Audio Video Stack 58

Audio/Video Stack 58 has three main functions:
configure demultiplexing, start audio and video decoders;
manage synchronization between Audio and Video;
and regulate the data streaming, getting Video bit buffer level, and supply it for Injector client.

It is not necessary to pause or freeze video, mute sound or display still picture.

The synchronization of Audio from Video decoders is made thanks to Audio PTS and Video PTS. The PCRs from flow are not managed, the VCXO is set to 27 MHz.

STC value is set with first Video PTS. The synchronisation algorithm already exists in audio driver. The only need is to modify a function in order to set STC value with Video PTS. This can be processed as follows.

Watching video PTS is not aborted in the case an error occurs in the stream (STC/video PTS distance is updated every time a PTS occurs).

The stack is also tolerant regarding bit-buffers underflow, i.e. neither decoding process reset, nor bit-buffer reset.

The bit-buffers (VBB 66 and ABB 67) are correctly sized for a PULL model, that is the decoder process regulates the data streaming. As concerns the VBB 66, it is sized for MLMP feature, around 356 Kbytes. To size the ABB 67, the ratio between the lowest video bit rate and the highest audio bit rate is computed. This ratio is applied as follows to size the ABB 67, with mVBR standing for the minimum video bit rate and MABR standing for the maximum audio bit rate:

ABB size=MABR/mVBR*(MLMP VBB size).

For example, mVBR and MABR are respectively worth 1 Mbits/s and 448 kbits/s.

As additional features, the clients may send to the server 10, control messages for slow or fast motion.

In a particular embodiment for slow motion, the period PERIOD for sending the data portions is made longer (the periodicity modification depending on the slowing level requested by the client), while the periodicity for the keep alive messages is kept unchanged.

In a particular variant embodiment for fast motion and reverse motion, the client is further able to send to the server 10 specific control messages "SEEK" for ordering a positioning in a data file to be streamed, which may be a number of bytes with respect to a beginning or an end of that file. The SEEK messages may then contain both a direction and an offset. The client then uses the SEEK messages between XOFF and XON messages, so as to master the playing speed as well as the quantities of chosen data, and to compensate for underflows in case of fast motion. The sequence of the sent orders if then: XOFF/SEEK(direction, offset)/XON/XOFF . . .

Further, in that particular embodiment, the client is intended to send to the server 10 information on a chosen decoding algorithm for fast motion, for example to take only images of "I" type in GOPs (Groups of Pictures) for decoding.

The client is then in charge of steady playing, through appropriate determination of the positioning.

Also, like for slow motion, the periodicity for the keep alive messages is kept unchanged.

The invention claimed is:

1. Data requesting device connected through at least one communication network to at least one data server, comprising:
   sending means for sending requests of determined data to a server via said at least one communication network,
   receiving means for receiving streamed data from said server via said at least one communication network and for providing said data to processing means for them to be exploited,
   control means for producing pause control signals, to pause data streaming from said server, and to trigger the sending of said pause control signals to said server via said at least one communication network through said sending means,
   a maintenance means for generating normal state signals for said server to indicate a normal operation at said data requesting device, and for triggering periodic transmission of said normal state signals to said server via said at least one communication network through said sending means,
   said receiving means receives a special warning message from said server via said at least one communication network when said server has not received said normal state signals in due time, and said maintenance means triggering a sending of a normal state signal to said server via said at least one communication network when said at least one special warning message is received,
   said due time for reception of normal state signals being given by an expected time period increased by a duration depending on a round-trip time for communication between said data requesting device and said server via said at least one communication network.

2. Data requesting device according to claim 1, wherein said control means produces resume control signals for resuming data streaming from said server after pausing, and said sending means are transmits to said server via said at least one communication network said resume control signals.

3. Data requesting device according to claim 1, wherein said data requesting device comprises a user interface, enabling a user to trigger said control means and said sending means, so as to cause said control signals to be provided to said server via said at least one communication network.

4. Data requesting device according to claim 1, wherein said received data being stored in a central memory before being exploited, said data requesting device comprises regulation means for triggering said control means to produce a pause control signal when said data in said central memory exceed a predetermined high threshold level of said central memory.

5. Data requesting device according to claim 4, wherein said regulation means triggers said control means to produce a resume control signal when said streaming has been paused by said regulation means and said data in said central memory decrease down to a predetermined low threshold level of said central memory.

6. Data requesting device according to claim 4, wherein at least one of said threshold levels of said central memory depends on a round-trip time for communication between said data requesting device and said server via said at least one communication network.

7. A decoder comprising a data requesting device according to claim 1.

8. Data requesting process through at least one communication network from at least one data server, comprising the following steps:
   sending requests of determined data to the at least one server via said at least one communication network,
   receiving streamed data from said at least one server via said at least one communication network,
   and producing and sending to said at least one server via said at least one communication network, pause control signals, for pausing data streaming from said server,
   Generating and periodically transmitting to said at least one server via said at least one communication network, normal state signals, for said at least one server for indicating a normal operation at said data requesting device,
   receiving a special warning message from said at least one server via said at least one communication network when said at least one server has not received said normal state signals in due time, and triggering a sending of a normal state signal to said at least one server via said at least one communication network when said at least one special warning message is received, said due time for reception of normal state signals being given by an expected time period increased by a duration depending on a round-trip time for communication between said data requesting device and said server via said at least one communication network.

9. Data transmitting device according to claim 8, wherein said receiving means receives resume control messages from said data requesting device, and said streaming means resumes said data streaming when said streaming has been paused and one of said resume control messages is received.

10. Data transmitting device via at least one communication network comprising:

receiving means for receiving requests of determined data from at least one data requesting device via said at least one communication network, and streaming means for triggering streaming of said data to said data requesting device via said at least one communication network, Said receiving means receiving from said data requesting device pause control messages, Said streaming means pausing said data streaming when said pause control messages are received, said receiving means receives normal state signals periodically from said at least one data requesting device, an alarm means for triggering an alarm state when said normal state signals are not received in due time, said alarm means producing a warning message when said normal state signals are not received in due time, transfer means for sending said warning message to said at least one data requesting device via said at least one communication network, said receiving means receiving a normal state signal from said at least one data requesting device when said warning message is received by said at least one data requesting device, said due time for reception of normal state signals being given by an expected time period increased by a duration depending on a round-trip time for communication between said data requesting device and said server via said at least one communication network, said data transmitting device being provided to a data requesting device.

11. Data transmitting process via at least one communication network, comprising the following steps:

receiving requests of determined data from at least one data requesting device via said at least one communication network, streaming said data to said data requesting device via said at least one communication network, and receiving from said data requesting device pause control messages, pausing said data streaming when said pause control messages are received, receiving periodically normal state signals from said data requesting device, and triggering an alarm state when said normal state signals are not received in due time, sending a special warning message via said at least one communication network to said at least one data requesting device when said normal state signals are not received in due time, and receiving of a normal state signal via said at least one communication network when said at least one special warning message is received by said at least one data requesting device, said due time for reception of normal state signals being given by an expected time period increased by a duration depending on a round-trip time for communication over said at least one communication network between said data requesting device and a data transmitting device compliant with claim 10 executing said data transmitting process.

* * * * *